(12) United States Patent
Geier

(10) Patent No.: US 11,758,895 B2
(45) Date of Patent: Sep. 19, 2023

(54) INSECT TRAP AND METHOD FOR ATTRACTING AND/OR CAPTURING FLYING INSECTS

(71) Applicant: Biogents AG, Regensburg (DE)

(72) Inventor: Martin Geier, Sulzbach-Rosenberg (DE)

(73) Assignee: Biogents AG, Regensburg (DE)

( * ) Notice: Subject to any disclaimer, the term of this patent is extended or adjusted under 35 U.S.C. 154(b) by 185 days.

(21) Appl. No.: 16/642,458

(22) PCT Filed: Aug. 22, 2018

(86) PCT No.: PCT/EP2018/072651
§ 371 (c)(1),
(2) Date: Feb. 27, 2020

(87) PCT Pub. No.: WO2019/042839
PCT Pub. Date: Mar. 7, 2019

(65) Prior Publication Data
US 2020/0187481 A1 Jun. 18, 2020

(30) Foreign Application Priority Data

Sep. 1, 2017 (DE) .................. 10 2017 120 212.9

(51) Int. Cl.
*A01M 1/06* (2006.01)
*A01M 1/10* (2006.01)

(52) U.S. Cl.
CPC .............. *A01M 1/06* (2013.01); *A01M 1/106* (2013.01)

(58) Field of Classification Search
CPC .......... A01M 1/06; A01M 1/08; A01M 1/023; A01M 1/02; A01M 1/04; A01M 1/00; A01M 1/10; A01M 1/106; A01M 1/12
(Continued)

(56) References Cited

U.S. PATENT DOCUMENTS 1,671,404 A * 5/1928 Cherry .................... A01M 1/08
43/139
1,693,368 A * 11/1928 Cherry .................... A01M 1/08
55/510
(Continued)

FOREIGN PATENT DOCUMENTS

CA    2511015 A1 * 12/2005
CA    2746250 C  * 12/2015 ............ A01M 1/103
(Continued)

OTHER PUBLICATIONS

Translation of KR 10-1001317 B1 (Year: 2010).*
(Continued)

*Primary Examiner* — Darren W Ark
(74) *Attorney, Agent, or Firm* — Simmons Perrine Moyer Bergman PLC

(57) ABSTRACT

An insect trap (10) and a method for attracting and/or trapping insects (12) are disclosed. The trap (10) has an intake (14) leading into an interior space (20) of the insect trap (10), which intake (14) continues into a suction duct (16) where an air flow (18) provides a negative pressure at the intake (14). Furthermore, the trap (10) has a portion surrounding the suction duct (16) in the vicinity of the intake (14) and enveloping the suction duct (16) such that the suction duct extends into the interior space (20) of the trap (10). The portion is at least partially permeable to outflowing air (24) and forms at least part of an outer wall (22). In addition, a front side (28), adjoining the outer wall (22), is largely impermeable to air and is at least slightly spaced from an outlet (30) of the suction duct (16).

21 Claims, 1 Drawing Sheet

(58) Field of Classification Search
USPC .................... 43/139, 113, 112, 122, 107
See application file for complete search history.

(56) References Cited

U.S. PATENT DOCUMENTS

| | | | | |
|---|---|---|---|---|
| 2,046,430 | A * | 7/1936 | Rutherford | A01M 1/14 43/115 |
| 2,931,127 | A * | 4/1960 | Mayo | A01M 1/08 43/139 |
| 3,120,075 | A * | 2/1964 | Barnhart, Sr. | A01M 1/08 43/139 |
| 3,201,893 | A * | 8/1965 | Gesmar | A01M 1/08 43/139 |
| 4,127,961 | A * | 12/1978 | Phillips | A01M 1/145 43/139 |
| 4,141,173 | A * | 2/1979 | Weimert | A01M 1/08 43/139 |
| 4,282,673 | A | 8/1981 | Focks et al. | |
| 4,788,789 | A * | 12/1988 | Boobar | A01M 1/08 D22/122 |
| 4,856,226 | A * | 8/1989 | Taylor | A01M 1/08 43/111 |
| 5,020,270 | A * | 6/1991 | Lo | A01M 1/08 43/112 |
| 5,157,865 | A * | 10/1992 | Chang | A01M 1/08 43/113 |
| 5,241,779 | A * | 9/1993 | Lee | A01M 1/02 43/112 |
| 5,311,697 | A * | 5/1994 | Cavanaugh | A01M 1/08 43/132.1 |
| 5,323,556 | A * | 6/1994 | Carle | A01M 1/08 43/139 |
| 5,417,009 | A * | 5/1995 | Butler | A01N 25/20 43/113 |
| 5,647,164 | A * | 7/1997 | Yates | A01M 1/023 43/132.1 |
| 5,813,166 | A * | 9/1998 | Wigton | A01M 1/06 43/107 |
| 6,134,826 | A * | 10/2000 | Mah | A01M 1/223 43/99 |
| 6,286,249 | B1 * | 9/2001 | Miller | A01M 1/02 43/139 |
| 6,675,528 | B2 * | 1/2004 | Jablin | A01M 1/06 43/132.1 |
| 6,817,139 | B1 * | 11/2004 | Powell | A01M 1/08 43/139 |
| 7,774,976 | B2 * | 8/2010 | Geier | A01M 1/223 43/139 |
| 8,051,601 | B2 * | 11/2011 | Miller | A01M 1/08 43/138 |
| 8,141,291 | B2 * | 3/2012 | Schinazi | A01M 1/023 43/138 |
| 8,240,082 | B1 * | 8/2012 | Fall | A01M 1/08 43/138 |
| 8,381,431 | B2 * | 2/2013 | Ishii | A01M 1/023 43/144 |
| 10,368,536 | B2 * | 8/2019 | Pearce | A01M 1/023 |
| 10,905,111 | B2 * | 2/2021 | Zhang | F04D 17/16 |
| 10,925,274 | B2 * | 2/2021 | Cherukumalli | A01M 1/026 |
| 2003/0000126 | A1 * | 1/2003 | Lenz | A01M 1/04 43/112 |
| 2003/0000127 | A1 * | 1/2003 | Smith | A01M 1/145 43/113 |
| 2003/0131525 | A1 * | 7/2003 | Bertani | A01M 1/08 43/139 |
| 2004/0068917 | A1 * | 4/2004 | Chan | A01M 1/08 43/113 |
| 2004/0159040 | A1 * | 8/2004 | Chen | A01M 1/223 43/112 |
| 2004/0181997 | A1 * | 9/2004 | Lee | A01M 1/08 43/139 |
| 2005/0279016 | A1 * | 12/2005 | Williams | A01M 1/10 43/122 |
| 2008/0236025 | A1 * | 10/2008 | Schinazi | A01M 1/06 43/107 |
| 2008/0236028 | A1 * | 10/2008 | McBride | A01M 1/023 43/107 |
| 2008/0244959 | A1 * | 10/2008 | Schinazi | A01M 1/023 138/40 |
| 2009/0000183 | A1 * | 1/2009 | Geier | A01M 1/223 43/107 |
| 2010/0212211 | A1 * | 8/2010 | Scheubeck | A01M 1/08 43/107 |
| 2011/0099885 | A1 * | 5/2011 | Maganga | A01M 1/14 43/112 |
| 2011/0283599 | A1 * | 11/2011 | Wu | A01M 1/106 43/113 |
| 2011/0289822 | A1 * | 12/2011 | Duehl | A01M 1/04 43/113 |
| 2013/0064679 | A1 * | 3/2013 | Tsai | A01M 1/06 416/247 R |
| 2014/0075824 | A1 | 3/2014 | Roulston et al. | |
| 2015/0342170 | A1 * | 12/2015 | Beitler | A01M 1/08 43/113 |
| 2016/0278361 | A1 * | 9/2016 | Work | A01M 1/14 |
| 2017/0000100 | A1 * | 1/2017 | Geier | A01M 1/08 |
| 2017/0006849 | A1 * | 1/2017 | Frutos | A01N 37/36 |
| 2017/0231210 | A1 * | 8/2017 | Lillamand | A01M 1/023 43/107 |
| 2017/0258068 | A1 * | 9/2017 | Eom | A01M 1/08 |
| 2017/0273291 | A1 * | 9/2017 | Yoo | G16Z 99/00 |
| 2017/0290319 | A1 * | 10/2017 | Walton | A01M 1/08 |
| 2018/0042211 | A1 * | 2/2018 | Zamboni | A01M 1/023 |
| 2018/0054981 | A1 * | 3/2018 | Work | A01M 29/12 |
| 2018/0064088 | A1 | 3/2018 | Hauptmann et al. | |
| 2018/0177175 | A1 * | 6/2018 | Tsai | A01M 1/14 |
| 2018/0288992 | A1 * | 10/2018 | Gallegos | A01M 1/106 |
| 2018/0340053 | A1 * | 11/2018 | Larsen | C08K 3/38 |
| 2018/0368383 | A1 * | 12/2018 | Ko | A01M 1/023 |
| 2019/0008132 | A1 * | 1/2019 | Eom | A01M 1/06 |
| 2019/0133106 | A1 * | 5/2019 | Eom | A01M 1/08 |
| 2019/0159441 | A1 * | 5/2019 | Zheng | A01M 1/023 |
| 2019/0281805 | A1 * | 9/2019 | Jaffrey | A01M 1/2033 |
| 2019/0297868 | A1 * | 10/2019 | Warner | A01M 1/106 |
| 2019/0313619 | A1 * | 10/2019 | Lee | A01M 1/08 |
| 2019/0335737 | A1 * | 11/2019 | Dolshun | A01M 1/106 |
| 2020/0107534 | A1 * | 4/2020 | Zheng | A01M 1/08 |
| 2020/0113164 | A1 * | 4/2020 | Zamboni | A01M 1/106 |
| 2020/0245604 | A1 * | 8/2020 | CHerukumalli | A01M 1/08 |
| 2020/0296950 | A1 * | 9/2020 | Backmark | A01M 1/103 |
| 2021/0045377 | A1 * | 2/2021 | Qin | A01M 1/2094 |
| 2021/0153493 | A1 * | 5/2021 | Zhang | F21K 9/237 |
| 2021/0219535 | A1 * | 7/2021 | Romanova | A01M 1/08 |
| 2021/0400944 | A1 * | 12/2021 | Lee | A01M 1/08 |

FOREIGN PATENT DOCUMENTS

| | | | | |
|---|---|---|---|---|
| CA | 2927248 | A1 * | 3/2017 | ............ A01M 99/00 |
| CA | 2773657 | C * | 9/2017 | ............ A01M 1/02 |
| CN | 204157513 | U | 2/2015 | |
| CN | 204860705 | U | 12/2015 | |
| CN | 205124812 | U | 4/2016 | |
| CN | 205658234 | U * | 10/2016 | ............ A01M 1/106 |
| CN | 206238150 | U | 6/2017 | |
| CN | 108601338 | A * | 9/2018 | ............ A01M 1/023 |
| CN | 110537534 | A * | 12/2019 | ............ A01M 1/06 |
| EP | 1575355 | B1 | 8/2006 | |
| EP | 1745697 | A1 * | 1/2007 | ............ A01M 1/023 |
| EP | 3430899 | B1 * | 9/2021 | |
| GB | 2547420 | A * | 8/2017 | ............ A01M 1/226 |
| JP | 2008118865 | A | 5/2008 | |
| JP | 2009240286 | A * | 10/2009 | |
| JP | 2012010653 | A | 1/2012 | |
| JP | 2014083005 | A * | 5/2014 | |
| JP | 6082228 | B2 * | 2/2017 | |
| JP | 2017023122 | A * | 2/2017 | |
| JP | 2018000185 | A * | 1/2018 | |
| JP | 2020150814 | A * | 9/2020 | |
| KR | 200367892 | Y1 | 11/2004 | |
| KR | 200367892 | Y1 * | 11/2004 | |
| KR | 200393447 | Y1 | 8/2005 | |

(56) References Cited

FOREIGN PATENT DOCUMENTS

| KR | 200416317 Y1 * | 5/2006 | |
|---|---|---|---|
| KR | 20060043085 A * | 5/2006 | |
| KR | 100810051 B1 * | 3/2008 | |
| KR | 100856377 B1 * | 9/2008 | |
| KR | 20090056763 A * | 6/2009 | |
| KR | 20090086858 A * | 8/2009 | ............ A01M 1/08 |
| KR | 20100067827 A * | 6/2010 | |
| KR | 101001317 B1 * | 12/2010 | |
| KR | 20110019061 A | 2/2011 | |
| KR | 20110087846 A | 8/2011 | |
| KR | 20120017307 A * | 2/2012 | |
| KR | 20120097077 A * | 9/2012 | |
| KR | 20120097077 A | 9/2012 | |
| KR | 20120007193 U | 10/2012 | |
| KR | 20130041411 A * | 4/2013 | |
| KR | 101258655 B1 * | 5/2013 | |
| KR | 20150027945 A * | 3/2015 | |
| KR | 101507554 B1 * | 4/2015 | ............ G06K 9/209 |
| KR | 101523059 B1 * | 5/2015 | |
| KR | 101621958 B1 | 5/2016 | |
| KR | 20200073842 A * | 6/2020 | |
| SU | 1306544 A1 * | 4/1987 | |
| WO | WO-03007709 A1 * | 1/2003 | ............ A01M 1/08 |
| WO | WO-2004054358 A3 * | 12/2004 | ............ A01M 1/2016 |
| WO | WO-2005092020 A2 * | 10/2005 | ............ A01M 1/06 |
| WO | WO-2007005968 A1 * | 1/2007 | ............ A01M 1/02 |
| WO | 2014204162 A1 | 12/2014 | |
| WO | WO-2016020627 A1 * | 2/2016 | ............ A01M 1/06 |
| WO | WO-2016126172 A1 * | 8/2016 | ............ A01M 1/06 |
| WO | WO-2016135765 A1 * | 9/2016 | ............ A01M 1/08 |
| WO | WO-2018017982 A1 * | 1/2018 | ............ A01M 1/023 |
| WO | WO-2019217174 A1 * | 11/2019 | ............ A01G 9/02 |
| WO | WO-2019221014 A1 * | 11/2019 | ............ A01M 1/02 |
| WO | WO-2020021892 A1 * | 1/2020 | ............ A01M 1/02 |
| WO | WO-2020027761 A1 * | 2/2020 | ............ A01M 1/08 |
| WO | WO-2020051030 A1 * | 3/2020 | ............ G01V 8/20 |
| WO | WO-2020161749 A1 * | 8/2020 | ............ A01M 1/223 |

OTHER PUBLICATIONS

First Chinese Office Action dated Jun. 1, 2021.
PCT-Application: PCT/EP2018/072651; filed: Aug. 22, 2018—International Search Report and Written Opinion dated Nov. 2, 2018.
PCT Application: PCT/EP2018/072651 filed Aug. 22, 2018—International Preliminary Report of Patentability from WIPO dated Mar. 12, 2020—English Translation.

* cited by examiner

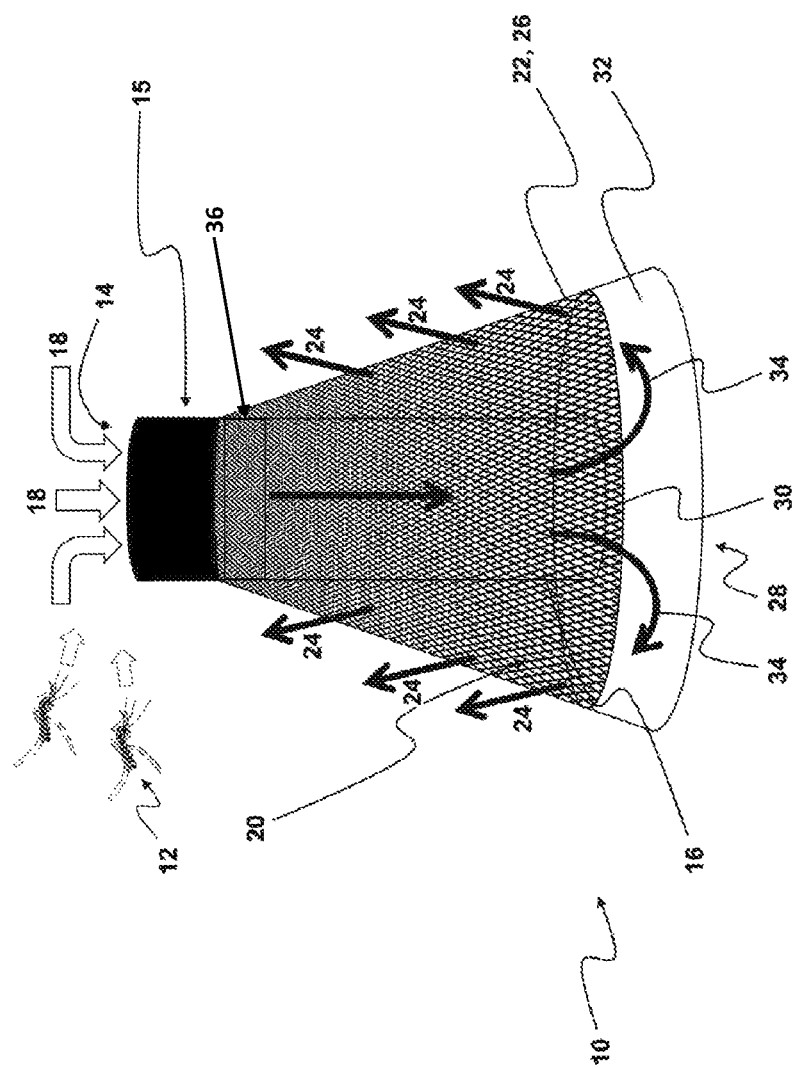

INSECT TRAP AND METHOD FOR ATTRACTING AND/OR CAPTURING FLYING INSECTS

CLAIM OF PRIORITY

The present application claims priority to International Application PCT/EP2018/072651, filed Aug. 22, 2018, which in turn claims priority to German Application DE 10 2017 120 212.9, filed Sep. 1, 2017, which are incorporated by reference.

FIELD OF THE INVENTION

The present invention concerns an insect trap with the characteristics of the independent claim 1 and a method for attracting and/or trapping insects such as flying insects and/or pest insects with the characteristics of the independent method claim.

BACKGROUND OF THE INVENTION

The prior art knows a lot of different embodiments of insect traps. A known design of such insect traps frequently used in practice contains a housing with optically effective attractants and/or with attractants contained therein as well as an intake or a suction opening, which intake promotes the flying in of flying insects to be caught into the trap interior by an air flow acting as a suction current or which intake sucks in the insects by an air flow acting as a suction current, thereby transporting the insects into the trap, where they are fixed and stored and/or rendered harmless.

Such an insect trap, which combines optical attractants with emitting weak air currents, is known from EP 1 575 355 B1. In this well-known insect trap, a light-colored surface is designed as an outflow surface, which surface simultaneously emits a weak air flow. Within the light-colored surface at least one dark contrasting area is located, which can be perceived as such by the insects to be attracted and which may also be designed as a dark suction channel for sucking in the insects. In addition, the trap may be equipped with an attractant, which is attractive to the insects to be attracted and which is emitted by the trap.

Further insect traps equipped with blowers for sucking in flying insects to be trapped are disclosed e.g. in U.S. Pat. No. 4,282,673 A and JP 2012 010 653 A. These traps each have characteristic cone-shaped catching nets, with the tip of the cone pointing downwards.

Another such trap is disclosed in U.S. Pat. No. 5,157,865 A, whereby the shown cone-shaped catching net merges into a collection container down below.

An insect trap with a cone-shaped inner tube can also be seen in CN 204 157 513 U. Similar traps can also be found in documents KR 2012 000 71 93 U, KR 2003 93 447 Y1 and KR 2003 67 892 Y1.

A further insect trap working with air currents can moreover be found in KR 101 621 958 B1.

In view of the insect traps already known from the prior art, it can be regarded as a primary objective of the present invention to create a simply constructed insect trap, which insect trap is not only very effective in terms of its trapping action, but which insect trap is also constructed very simply and thus can be produced in a very cheap manner.

This object is achieved with an insect trap with the characteristics of the independent claim. Features of further advantageous embodiments of the invention can be found in the dependent claims.

SUMMARY OF THE INVENTION

In order to achieve the aforementioned objective, the invention proposes an insect trap which can serve in particular to attract and/or trap flying insects and/or pest insects. This insect trap according to the invention contains an intake or suction opening which continues into a suction duct and leads to an interior space of the insect trap, in which suction duct an air flow prevails, which air flow applies a negative pressure or a suction current to the intake. In addition, the insect trap has an outer wall, which wall surrounds the suction duct near the intake and which outer wall envelops the suction duct in the further region at a changing radial distance and which widens in a direction parallel to the direction of the air flow passing through the suction duct, which a portion of the outer wall is at least partially permeable to outflowing air. In addition, the insect trap is equipped with a front side or bottom side, which front side or bottom side is adjoined to the outer wall, which front side or bottom side is largely impermeable to incoming or outflowing air and which front side or bottom side is located opposite the intake, and which front side or bottom side is at least slightly spaced apart from an outlet or open front side of the suction duct, which outlet is extending into the interior of the trap.

The portion of the insect trap partially forming the outer wall, which portion is at least partially permeable to outflowing air, may, in particular, have a net-like or mesh-like structure with a mesh size that is large enough to allow sufficient air flow to pass through, but which mesh size reliably prevents the insects trapped within the interior of the trap from escaping.

Preferably, the front side or bottom side of the insect trap according to the invention is formed by a structure that is almost impermeable to air or by a material that is almost impermeable to air. In any case, only a small amount of air should be able to pass through this structure, compared to the more pronounced air permeability of the net-like or mesh-like outer wall. However, airtight materials are also useful as bottom material for the insect trap. In particular, the front side or bottom side of the insect trap may be cylindrical or oval or polygonal and flat as the case may be, so that it forms the lower horizontal bottom side of the insect trap, the insect trap being in a suspended arrangement with the intake located on the upper side. However, curved contours are also possible, in particular a slightly outwardly curved convex contour of the bottom side, which at the same time forms the lower front side of the insect trap.

In particular, the insect trap may be designed in such a way that the outer wall of the insect trap, starting from a region surrounding the suction duct near the intake, opens or widens in a direction towards the front side or bottom side, thereby enclosing an acute opening angle to the center axis of the suction duct. The acute opening angle between the outer wall of the insect trap and the central axis of the suction duct can vary within wide limits, for example between about ten angular degrees and about sixty degrees angular degrees. However, a particularly useful and practical embodiment of the insect trap can provide that the acute opening angle between the outer wall of the insect trap and the central axis of the suction duct is between about fifteen angular degrees and about sixty angular degrees. Where appropriate, it may be useful to limit the acute opening angle between the outer wall of the insect trap and the center axis of the suction duct to a range between about twenty angular degrees and about forty-five angular degrees.

In a first embodiment, the outer wall of the insect trap between a region enclosing the suction duct in the vicinity of the intake and a transition region to the front side or bottom side can have a cone shaped contour, whereby the bottom side is cylindrical. However, embodiments with a non-cone-shaped contour are also conceivable, whereby the outer wall of the insect trap may have a pyramidal contour with at least three pyramid flat sides between a region enclosing the suction duct in the vicinity of the intake and a transition region to the front or bottom side. Further modifications are conceivable and useful, so that the outer wall of the insect trap can, for example, optionally have either a flat contour or a curved contour between a region enclosing the suction duct near the intake and a transition region to the front or bottom side. Combinations are possible, such as transitions from a plane contour to a curved contour or vice versa. Also, for example, an oval cone shaped contour with an oval bottom side and an adjoining outer wall with a corresponding shape would be conceivable.

A particularly preferred variant of the insect trap according to the invention provides a collar on the front side or bottom side, which collar roughly follows the contour of the outer wall. This collar of the front side or bottom side, which extends upwards from the plane front side or bottom side or from the slightly outwardly or downwardly curved convex front side or bottom side and which is contoured according to the outer wall as a cylindrical section or a conical section or otherwise contoured section, may, for example, have a height which may reasonably be between five percent and ten percent of the total height of the outer wall. Depending on the dimensions of the insect trap, the collar can have a height of between two centimeters and twenty centimeters. This collar ensures in an advantageous manner that the air sucked in through the suction duct is swirled inside the trap in a desired manner and is largely evenly deflected over the entire height of the net-like outer wall and can flow out there, which outer wall is tapering upwards towards the mouth of the intake. Without such a collar, in particular, the undesirable effect could occur that a large part of the sucked in air flow, which is deflected at the bottom side, would escape through the outer wall directly in the lower, wider area. Thereby only remnants of the air flow could reach the upper areas of the outer wall. This would be very unfavorable with regard to the desired uniform weak and upwardly directed air flow, which should flow out over the entire air-permeable outer wall of the trap and thus with its weak upward convection currents create the illusion of a human body or an animal body for the insects to be attracted.

The weak air flow emitted by the outer wall of the insect trap may be enriched by chemical attractants which are emitted by the trap and mixed with the sucked in air so that they are released via the outer wall. A source of such an attractant or mixture of attractants may be located, for example, inside and/or on the outer wall of the trap, the source ensuring, preferably by appropriate dosing devices, that uniform quantities of attractant are released and mixed with the air flowing out through the outer wall.

Such an insect trap can, for example, have a total height of about ten centimeters to about one hundred centimeters or possibly even more, whereby the suction duct can have a typical diameter of about three centimeters to about fifteen centimeters or twenty centimeters and whereby the front side or bottom side can have a diameter of about ten centimeters to about one hundred centimeters (or optionally a little more).

Furthermore, the insect trap according to the invention may provide, that an air flow passing through the intake and being generated by a suction flow has an air velocity in the order of magnitude of about one meter per second to about ten meters per second. In particular, an air flow passing through the intake and generated by a suction flow can have an air velocity of the order of two meters per second to six meters per second, in particular about four meters per second. The sucked in air flow has an air velocity that makes it much more difficult for the attracted insects to escape once they are near the intake. Rather, they should be sucked into the interior of the trap by a sufficiently strong suction air flow and then reliably be prevented from flying back out of the trap interior. For generating the air flow at least one fan can be located inside the suction duct.

Furthermore, an air flow passing through the air-permeable structure of the outer wall and penetrating the insect trap to the outside may have an air velocity in the order of magnitude of about 0.02 meter per second to about 1.0 meter per second, again a particularly preferable embodiment may provide that an air flow passing through the air-permeable structure of the outer wall and penetrating the insect trap to the outside may have an air velocity in the order of magnitude of about 0.05 meter per second to 0.6 meter per second. The air volume flow of the outgoing air is naturally dependent on the volume flow of the sucked in air, so that the air velocity can be adjusted by matching the duct sizes, the widths of the mesh, the speed of the fan used and the ratios of the area of the outer wall to the other dimensions of the suction ducts. As already mentioned above, the weak air flow, which flows out over the entire outer wall as evenly as possible, forms an attractive lure for many flying insects, since the air flow alone—even without enrichment with any chemical attractants—provides for the insects a clearly perceptible illusion of a human body or an animal body showing the weak convection air movements typical for such bodies. For this reason, the flow velocities specified herein should be aimed for, since this attracting effect for the insects is created in particular with the specified orders of magnitude for the air movements flowing out over a large area (approx. 0.05 . . . 0.6 m/s).

This perceptible luring effect can be bolstered up by optical attracting stimuli located at the trap, e.g. by differences in brightness, color effects or different light-dark contrasts. As another option a perceptible optical attractive stimulus for the insects to be caught can be generated on the insect trap by creating a contrast effect on the outer surfaces. In particular, it may be provided, that the net structure of the outer wall of the insect trap is relatively light, while the area surrounding the intake, for example, is relatively dark, e.g. the upper section of the suction duct, where the intake is also located, being designed as a dark or black ring. The inside of the intake may also be designed dark or black, while the section of the net-like portion of the outer wall that extends downwards below the dark or black ring is clearly distinguished therefrom by the lighter contrast effect. The effect on the insects may be such that they perceive the dark areas as more attractive, especially in front of the lighter areas of the outer wall that highlight the dark areas, which has a luring effect for many insects.

Furthermore, it can be advantageous, if one outlet of the suction duct inside the insect trap is at a distance from the front side or the bottom side that corresponds approximately to the height of the collar of the front side or bottom side. The optimum distance is to be determined by tests, whereby an important criterion for a favorable distance can be the optimized air distribution within the trap leading to the most uniform outflow of air possible over the entire outer wall.

In addition, the insect trap may include within its interior space at least one device for retaining, fixing and/or killing the insects, which insects have passed through the suction duct and are situated within the interior space of the trap.

In addition, the insect trap according to the invention can optionally be equipped with a device and/or an electronic sensor system for recording the trapped insects. This device can, for example, be located at the bottom below the outlet of the suction duct or within the suction duct itself, allowing for a reliable detection of all insects passing through the suction duct.

The trap according to the invention is suitable for attracting and trapping numerous different insect species, in particular flying insects such as mosquitoes, yellow fever mosquitoes, Zika mosquitoes or other disease transmitting insect species that are potentially dangerous to humans.

The present invention comprises, in addition to the insect trap described in numerous embodiments and equipment variations, a method for attracting and/or trapping flying insects and/or pest insects, which insects are attracted by a weak air flow emitted from a portion of an insect trap, which portion is permeable to air but not permeable to insects, wherein the insects, on their way into an interior space of the insect trap, pass an intake, which intake continues into a suction duct, in which suction duct an air flow prevails, which air flow is leading into the interior of the insect trap and which air flow acts on the intake with a negative pressure or with a suction flow. This insect trap can be designed in particular according to one of the embodiments described above.

It should be expressly mentioned at this point that all aspects and embodiments explained in connection with the insect trap according to the invention equally concern or may be partial aspects of the method for attracting and/or trapping insects according to the invention. Therefore, if at any point in the description or also in the claim definitions concerning the insect trap according to the invention, certain aspects and/or connections and/or effects are mentioned, these equally apply to the method according to the invention. Conversely, the same applies, so that all aspects and embodiments explained in the context of the method according to the invention equally concern or may be partial aspects of the insect trap according to the invention. Therefore, if at any point in the description or also in the claim definitions relating to the method according to the invention certain aspects and/or connections and/or effects are mentioned, these equally apply to the insect trap according to the invention.

BRIEF DESCRIPTION OF THE FIGURES

In the following passages, the attached FIGURES further illustrate exemplary embodiments of the invention and their advantages. The size ratios of the individual elements in the FIGURES do not necessarily reflect the real size ratios. It is to be understood that in some instances various aspects of the invention may be shown exaggerated or enlarged to facilitate an understanding of the invention.

FIG. 1 shows a schematic representation of an embodiment of an insect trap according to the invention.

For the sake of clarity, only those reference signs that are necessary for the description are shown in the single FIGURE. It should be understood, that the embodiment shown here is only an exemplary description of the insect trap according to the invention, but which are not intended to limit the scope of the disclosure.

DETAILED DESCRIPTION OF THE INVENTION

The schematic representation of FIG. 1 shows the essential principles of a potential embodiment of an insect trap 10 according to the invention, which can serve in particular to attract and/or trap flying insects and/or pest insects 12 such as mosquitoes, yellow fever mosquitoes, Zika mosquitoes, tiger mosquitoes etc.

The insect trap 10 shown schematically in the only FIG. 1 has an upper circular intake 14, which continues in a vertically downwards leading cylindrical suction duct 16, which intake 14 leads to or into an interior space 20 of the insect trap 10, in which suction duct 16 an air flow prevails that is acting on the intake 14 with negative pressure or with a suction flow 18. In addition, the insect trap 10 is equipped with a truncated cone-shaped outer wall 22, which has a portion that is at least partially permeable to outflowing air 24, in particular the portion is formed by a net-like structure 26 with a mesh size that is large enough to allow sufficient air flow 24 to pass through it, but which mesh size reliably prevents the insects 12 trapped within the interior space 20 of the trap 10 from escaping.

As shown in FIG. 1, the outer wall 22 encloses the suction duct 16 in the vicinity of the intake 14 and envelops the suction duct 16 in the further downwardly extending region at a changing radial distance, so that the outer wall 22 widens towards the bottom in a cone shape. In addition, the insect trap 10 is equipped with a front side or bottom side 28 adjoining to the outer wall 22 and which front side or bottom side 28 is largely impermeable to incoming air or to outgoing air and which front side or bottom side 28 is located opposite the intake 14, which front side or bottom side 28 is arranged at a distance from an outlet 30 of the suction duct 16 extending into the interior space 20 of the insect trap 10. In the depicted embodiment of the insect trap 10, the bottom side 28 has a plane and cylindrical shape so that it is aligned perpendicular to the longitudinal axis of the suction duct 16.

At least one fan for generating the air flow 18 can be arranged within the suction duct 16. The air flow 18 that is passing through the suction duct 18 can have an air velocity in the order of 1.0 m/s to 10 m/s generated by this fan. Preferably, an air flow 18 generated by a suction flow, passing through the intake 14 and the suction duct 16, can have an air velocity in the order of about 2.0 m/s to about 6.0 m/s, in particular about 4 m/s. The sucked in air flow 18 thus has an air velocity that makes it much more difficult for the attracted insects 12 to escape once they are close to the intake 14. Rather, they are to be sucked into the interior space 20 of the trap 10 with the aid of the sufficiently strong sucked in air flow 18 and are reliably prevented from flying back out of the trap interior space 20. Inside trap 10, suitable means for retaining or killing the captured insects 12 may be arranged, which means are not shown here.

The air flow 24 passing through the outer wall 22 and penetrating the insect trap 10 to the outside can preferably have an air velocity in the order of about 0.02 m/s to about 1.0 m/s, whereby again a particularly preferable embodiment provides that an air flow 24 passing through the air-permeable structure 26 of the outer wall 22 and penetrating the insect trap 10 to the outside can have an air velocity in the order of about 0.05 m/s to about 0.6 m/s. The air volume flow of the outflowing air 24 is naturally dependent on the volume flow of the sucked in air flow 18, so that the air velocity can be determined by matching the duct sizes, the widths of the mesh, the speed of the fan used and the ratios of the area of the outer wall 22 to the other dimensions of the suction ducts.

These envisaged air velocities of the air flow 24 (approx. 0.05 m/s . . . 0.6 m/s), which is exiting as uniformly as possible from the entire outer wall 22, are adapted to typical perceptions of flying insects to be attracted, which insects associate or confuse such air flows with weak convection currents, which are emitted by preferred targets of these insects, particularly by living host organisms. Significantly faster air velocities are not perceived by the insects as equally attractive lures, as they can be no longer associated with their typical host organisms. The weak air flow 24 emitted by the outer wall 22 of the insect trap 10 can optionally be enriched with chemical attractants emitted by the trap 10 and mixed with the sucked in air flow 18 so that the chemical attractants are released via the outer wall 22.

As FIG. 1 illustrates, the outer wall 22 of the insect trap 10 widens towards the front side or bottom side 28, starting from an upper area surrounding the suction duct 16 near the intake 14 (below the dark ring 15) and enclosing an acute opening angle to the central axis of the suction duct 16. This acute opening angle between the outer wall 22 of the insect trap 10 and the center axis of the suction duct 16 can basically vary within wide limits, for example between about 10° and about 60°. However, the embodiment of the insect trap 10 shown here, which is suitable for practical use, provides that the acute opening angle between the outer wall 22 of the insect trap 10 and the center axis of the suction duct 16 is between approx. 20° and 30°—and possibly also up to approx. 45°. In addition, the outer wall 22 as a whole has a truncated cone-shaped contour.

For the proper functioning of the insect trap 10 according to the invention a collar 32 formed on the front side or bottom side 28 is furthermore important, which collar 32 approximately follows the contour and angle of inclination of the outer wall 22. The collar 32 of the otherwise plane and circular front side or bottom side 28, which collar 32 is extending upwards and continuing into the outer wall 22, which outer wall 22 is permeable to air 24, may, for example, have a height which may reasonably be between 5% and about 15% of the total height of the outer wall 22. Thus, depending on the dimensions of the insect trap 10, the collar 32 can have a height of between approx. 2 cm and approx. 20 cm. The collar 32 ensures in an advantageous manner that the sucked in air flow 18, which is flowing through the suction duct 16 and is exiting at its outlet 30, is swirled in the desired manner as a deflected air flow 34 within the interior space 20 of the trap 10 and exits largely evenly over the entire height of the net-like outer wall 22, which outer wall 22 is tapering upwards towards the mouth of the intake 14. Without the depicted collar 32, the undesirable effect could arise, whereby a large part of the sucked in air flow 18 deflected at the bottom side 28, is exiting directly in the lower wider area of the outer wall 22 as outflowing air 24, while only remnants of the air flow 24 would reach the upper areas of the outer wall 22. This would be very unfavorable with regard to the desired uniform weak air flow 24, which desired air flow 24 should flow out over the entire air-permeable outer wall 22 of the trap 10 and form the illusion of a human body or animal body for the insects 12 to be attracted with its weak convection currents.

The insect trap 10 can, for example, have a total height of approx. 10 cm to 100 cm or even more, whereby the suction duct 16 can have a diameter of approx. 3 cm to 15 cm and the front side or bottom side 28 can have a diameter of approx. 10 cm to approx. 100 cm. However, other dimensions are also possible.

Furthermore, it may be advantageous, if one outlet 30 of the suction duct 16 within the interior space 20 of the insect trap 10 is at a distance from the front side or bottom side 28, which distance is corresponding approximately to the height of the collar 32 of the front side or bottom side 28. The optimum distance is to be determined by tests, whereby an important criterion for a favorable distance can be the optimization of the air distribution within the trap 10 leading to the most uniform possible outflow of air 24 over the entire outer wall 22.

The insect trap 10 can be mounted in a hanging position or in a standing position so that the intake 14 is directed upwards and the suction duct 16 runs approximately vertically, and whereby the front side or bottom side 28 forms a lower horizontal bottom side of the trap 10.

As a further option of the insect trap 10, an optical attractant can be created by designing a clearly perceptible contrast effect on the outer walls of the trap 10, which optical attractant is perceptible to the insects 12 to be caught. Thus FIG. 1 shows that the net-like structure 26 of the outer wall 22 of the insect trap 10 is relatively light, while the area around the intake 14 is relatively dark, here the area around the intake 14 is formed by a dark or black ring 15 that is forming the upper section of the suction duct 16 where the intake 14 is also located. The interior of the intake 14 may also be dark or black, while the region of the net-like outer wall 22 that extends downwards below the dark or black ring 15 distinguishes itself clearly due to the lighter contrast effect. The effect on the insects 12 may be such, that the insects 12 perceive the dark areas (the ring 15 and the inside of the upper section of the suction duct 16) as more attractive, especially in front of the lighter areas of the outer wall 22 which are highlighting the dark areas.

In addition, the insect trap 10 according to the invention can optionally be equipped with a device and/or an electronic sensor system to record the trapped insects, which device and/or system is not shown here.

The invention has been described with reference to a preferred embodiment. To the expert it is also conceivable, however, to make changes and modifications without leaving the scope of protection of the appended claims.

LIST OF REFERENCE SIGNS

10 Trap, insect trap
12 insects; flying insects
14 intake; suction opening
15 dark ring, black ring
16 suction duct
18 sucked in air flow
20 interior space, interior space of the trap
22 outer wall
24 outflowing air, weak air flow
26 air permeable portion of outer wall; net-like structure
28 front side or bottom side
30 outlet; front side (of the suction duct)
32 collar
36 Fan
34 deflected air flow

We claim:
1. A device to act as an insect trap (10) comprising:
an outer wall (22), including an at least partially air-permeable portion that is permeable to a first air flow (24), and a front side (28), with a collar (32), that is largely impermeable to air flow, wherein the outer wall (22) adjoins the front side (28) at the collar (32); and a suction duct (16) with an intake (14), an outlet (30), and a fan located inside the suction duct for generating a second air flow (18) from the intake (14) to the outlet (30), wherein the outer wall (22) attaches to, and surrounds, the suction duct (16) in a vicinity of the intake (14), wherein a radial distance from the suction duct (16) to the outer wall (22) increases as the outer wall (22) approaches the front side (28) in a direction of the second air flow (18), wherein the suction duct (16) extends from the intake (14) to the outlet (30) into an interior space (20) enclosed by the outer wall (22) and the front side (28), and the outlet (30) is radially spaced apart from an inner surface of the outer wall (22), and wherein the front side (28) and the collar (32) upwardly deflects the second air flow (18) to create the first air flow (24) through the at least partially air-permeable portion of the outer wall.

2. The device of claim 1, wherein the at least partially air-permeable portion has a net-like structure (26).

3. The device of claim 2, wherein the outer wall (22) forms an acute angle with a central axis of the suction duct (16).

4. The device of claim 3, wherein the acute angle between the outer wall (22) and the central axis of the suction duct (16) is between about ten degrees and about sixty degrees.

5. The device of claim 4, wherein the acute angle between the outer wall (22) and the central axis of the suction duct (16) is between about twenty degrees and about forty-five degrees.

6. The device of claim 3, wherein the outer wall (22) has a cone shape between a region of the outer wall (22) that is attached to the suction duct (16) in the vicinity of the intake (14) and another region of the outer wall (22) that adjoins the front side (28).

7. The device of claim 3, wherein the outer wall (22) has a curved contour between a region of the outer wall (22) that is attached to the suction duct (16) in the vicinity of the intake (14) and another region of the outer wall (22) that adjoins the front side (28).

8. The device of claim 1, wherein the outlet (30) is spaced from the front side (28) by approximately a height of the collar (28).

9. The device of claim 8, wherein the height of the collar (32) corresponds to between five percent and ten percent of a height of the outer wall (22).

10. The device of claim 9, wherein the height of the collar (32) is between approximately two centimeters and twenty centimeters.

11. The device claim 10, wherein the suction duct (16) may have a diameter of about three centimeters to about fifteen centimeters, and wherein the front side (28) may have a diameter of about ten centimeters to about one hundred centimeters.

12. The device of claim 1, wherein the second air flow (18) from the intake (14) to the outlet (30) has a velocity in a range of about one meter per second to about ten meters per second.

13. The device of claim 12, wherein the second air flow (18) from the intake (14) to the outlet (30) has a velocity in a range of about two meters per second to about six meters per second.

14. The device of claim 13, wherein the first air flow (24) has a velocity between about 0.02 meters per second and 1.0 meters per second.

15. The device of claim 14, wherein the velocity of the first air flow (24) is between about 0.05 meters per second and 0.6 meters per second.

16. The device of claim 15, wherein a distance between the outlet and the front side (28) corresponds approximately to a height of the collar (32).

17. The device of claim 16, wherein the suction duct (16) is approximately vertical relative to the ground when in use, and wherein the front side (28) is approximately horizontal relative to the ground when in use.

18. The device of claim 1, wherein the at least partially air-permeable portion of the outer wall (22) comprises an air-permeable structure.

19. The device of claim 18, wherein the air-permeable structure comprises a net-like or a mesh-like structure.

20. The device of claim 1, wherein the radial distance from the suction duct (16) to the outer wall (22) increases as the outer wall (22) approaches the outlet (30) of the suction duct (16) in a direction of the second air flow (18).

21. The device of claim 20, wherein a radial distance between the suction duct (16) in a vicinity of the intake (14) and the outer wall (22) is smaller than a radial distance between the suction duct (16) at the outlet (30) and the outer wall (22).

* * * * *